United States Patent
Baempfer et al.

(10) Patent No.: US 7,345,399 B2
(45) Date of Patent: Mar. 18, 2008

(54) MOTOR FOR A FUEL PUMP

(75) Inventors: Michael Baempfer, Rotenburg (DE); Jens Missun, Baunatal (DE); Wolfgang Warnke, Herleshausen (DE)

(73) Assignee: Siemens Aktiengesellschaft, München (DE)

( * ) Notice: Subject to any disclaimer, the term of this patent is extended or adjusted under 35 U.S.C. 154(b) by 74 days.

(21) Appl. No.: 10/581,661

(22) PCT Filed: Nov. 4, 2004

(86) PCT No.: PCT/EP2004/052799

§ 371 (c)(1), (2), (4) Date: Jun. 1, 2006

(87) PCT Pub. No.: WO2005/055392

PCT Pub. Date: Jun. 16, 2005

(65) Prior Publication Data

US 2007/0108860 A1  May 17, 2007

(30) Foreign Application Priority Data

Dec. 1, 2003  (DE) .................... 103 56 078

(51) Int. Cl.
*H02K 1/27* (2006.01)

(52) U.S. Cl. ............ 310/261; 310/156.38; 310/156.17; 417/423.7

(58) Field of Classification Search ......... 310/156.38, 310/156.16, 156.17, 156.24, 156.01, 209, 310/191, 156.03, 156.14, 156.15, 156.46, 310/156.48, 156.54, 156.56, 156.59; 417/423.3, 417/423.7, 423.1

See application file for complete search history.

(56) References Cited

U.S. PATENT DOCUMENTS

| | | | | | |
|---|---|---|---|---|---|
| 2,568,548 | A | * | 9/1951 | Howard et al. | 417/423.3 |
| 2,694,781 | A | * | 11/1954 | Hinz | 310/77 |
| 3,246,187 | A | * | 4/1966 | Iemura | 310/156.21 |
| 3,689,787 | A | * | 9/1972 | Saretzky | 310/266 |
| 3,754,844 | A | * | 8/1973 | Nusser et al. | 417/423.12 |
| 4,045,696 | A | * | 8/1977 | Lutz et al. | 310/49 R |
| 4,651,040 | A | * | 3/1987 | Gerstner et al. | 310/166 |
| 4,820,978 | A | | 4/1989 | Kirota | |
| 4,920,295 | A | * | 4/1990 | Holden et al. | 310/209 |
| 5,130,592 | A | * | 7/1992 | Bitsch et al. | 310/209 |
| 5,173,037 | A | * | 12/1992 | Martin et al. | 417/423.3 |
| 5,248,223 | A | * | 9/1993 | Hill | 415/55.3 |
| 5,298,826 | A | | 3/1994 | Lee et al. | |
| 5,574,323 | A | | 11/1996 | Nusser | |
| 5,582,510 | A | * | 12/1996 | Dobler et al. | 417/423.7 |
| 5,627,419 | A | * | 5/1997 | Miller | 310/74 |
| 5,762,481 | A | * | 6/1998 | Oi | 417/423.3 |

(Continued)

FOREIGN PATENT DOCUMENTS

DE  2756626 A1  6/1979

(Continued)

*Primary Examiner*—Darren E. Schuberg
*Assistant Examiner*—Naishadh N Desai
(74) *Attorney, Agent, or Firm*—Cohen Pontani Lieberman & Pavane LLP

(57) ABSTRACT

An electrically commutated motor for a fuel pump having a rotor connected to a shaft and having plastic-bonded ferrite, with a fuel-resistant shaped body formed by the plastic-bonded ferrite, and a magnetic return element adjustable in relation to the shaped body.

19 Claims, 1 Drawing Sheet

U.S. PATENT DOCUMENTS

| | | | |
|---|---|---|---|
| 5,912,523 A * | 6/1999 | Ziegler et al. | 310/237 |
| 6,109,893 A * | 8/2000 | Gliniecki et al. | 417/423.7 |
| 6,204,584 B1 | 3/2001 | Muszynski | |
| 6,220,826 B1 | 4/2001 | Dobler et al. | |
| 6,338,900 B1 * | 1/2002 | Tada et al. | 428/402 |
| 6,455,975 B1 | 9/2002 | Raad et al. | |
| 6,765,319 B1 * | 7/2004 | Thompson | 310/43 |
| 6,868,834 B1 * | 3/2005 | Mitani et al. | 123/495 |
| 6,919,663 B2 | 7/2005 | Iles-Klumpner | |
| 7,061,152 B2 * | 6/2006 | Petro et al. | 310/156.38 |
| 7,156,625 B2 * | 1/2007 | Grant | 417/313 |
| 7,195,466 B2 * | 3/2007 | Kobayashi et al. | 417/423.7 |
| 7,239,058 B2 * | 7/2007 | Petro et al. | 310/156.34 |
| 2002/0153791 A1 | 10/2002 | Hatz et al. | |
| 2005/0062354 A1 | 3/2005 | Illes-Klumpner | |

FOREIGN PATENT DOCUMENTS

| | | | |
|---|---|---|---|
| DE | 3224904 A1 | | 1/1984 |
| DE | 37 18047 A1 | | 12/1987 |
| DE | 4012161 A1 | | 10/1991 |
| DE | 43 31 803 A1 | | 3/1995 |
| DE | 29915359 U1 | | 2/2001 |
| DE | 10051239 A1 | | 4/2002 |
| DE | 103 09 776 A1 | | 10/2003 |
| EP | 0 236 116 A1 | | 9/1987 |
| EP | 0 547 767 A1 | | 11/1992 |
| EP | 1 324 474 A2 | | 7/2003 |
| JP | 04046539 | | 2/1992 |
| JP | 07170682 | | 4/1995 |
| JP | 200023399 | * | 2/1999 |
| JP | 2000245086 A | * | 9/2000 |

* cited by examiner

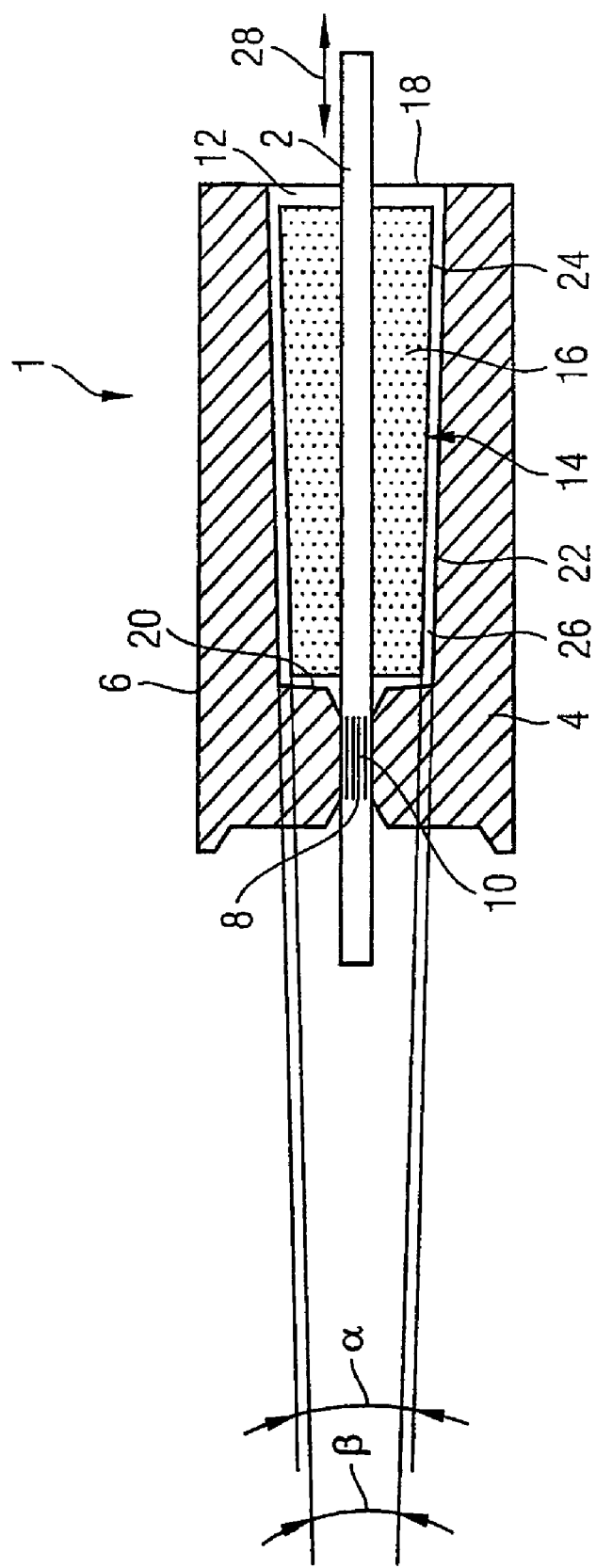

MOTOR FOR A FUEL PUMP

FIELD OF THE INVENTION

The invention relates to an electronically commutated motor for a fuel pump, comprising a rotor which is connected to a shaft in a rotationally fixed manner and has a plastic-bonded ferrite.

DISCUSSION OF THE PRIOR ART

Electronically commutated motors in the form of commutatorless DC motors, so called electronic motors, are known. Such brushless DC motors are distinguished in that they do not require servicing and the cost of producing them is comparatively low. It is also known to provide such motors with a rotor which is arranged on a shaft and is composed of a permanent-magnet material, for example a plastic-bonded barium ferrite.

One problem with the known motors is that the rotor is permanently damaged when it comes into contact with gasoline or diesel fuel, as is unavoidable when the motors are used to drive fuel pumps. Furthermore, the motors have a large spectrum of efficiency which is dependent on further system parameters.

U.S. Pat. No. 6,220,826 discloses an electronically commutated motor for a fuel pump of the type mentioned in the introduction.

U.S. Pat. No. 6,204,584 discloses a rotor for an electrically commutated motor which has a tubular permanent-magnet body with alternating poles on the circumference and a return element protruding into its continuous cylindrical through-opening, said return element having a circular basic cross section and one or more pairs of flat areas on its lateral surface. Air gaps between the return element and the tubular permanent-magnet body are formed by the flat areas. The return element can be adjusted by rotating the return element in the permanent-magnet body.

U.S. Pat. No. 6,455,975 B1 discloses a generator with a conical hub which is composed of a magnetic steel, whose lateral surface has a constant wall thickness and on which magnets are arranged.

The object of the invention is therefore to provide a motor of the type mentioned in the introduction for a fuel pump, which motor is highly efficient and at the same time has long service life.

SUMMARY OF THE INVENTION

According to the invention, this object is achieved in that the rotor has a fuel-resistant shaped body which is formed by the plastic-bonded ferrite, and in that a magnetic return element which can be adjusted in relation to the shaped body by being moved on the shaft is provided, with the shaped body having an axial recess in which the return element engages, with the axial recess having an opening side and a base side which is situated opposite the opening side and at which the shaped body is connected to the shaft, and with the axial recess forming a funnel which widens conically toward the opening side, and in that the return element forms a cone which tapers toward the base side of the recess.

The ability to adjust the return element in relation to the plastic-bonded ferrite which forms a shaped body makes it possible to match the magnetic flux specifically to the motor system while optimizing the efficiency of the motor. In this case, the shaped body allows deliberate interaction between the return element and the rotor which has two or more magnetic poles. The shaped body itself permanently retains its shape even in a fuel environment, as a result of which not only the electromagnetic properties and the power output of the motor remain constant over time, but also an unbalance of the rotor which increases wear is reliably avoided.

Particularly exact association of the shaped body and return element along with high stability of the motor arrangement is achieved by moving the return element.

A particularly compact structure is achieved by the return element engaging in the recess.

It is possible to imagine forming the recess and shaped body in such a way that the return element engages fully through the shaped body. However, particularly high stability and easy installation of the motor arrangement are achieved when the axial recess has an opening side and a base side which is situated opposite the opening side and at which the shaped body is connected to the shaft.

The ability to adjust the return element in relation to the shaped body is considerably simplified by the recess being in the form of a funnel and the return element being in the form of a cone.

If, according to one advantageous development of the invention, the opening angle of the funnel corresponds to the cone angle of the cone, the magnetic flux can be matched particularly exactly to the motor system; the lateral surface of the cone and the corresponding inner face of the funnel are always parallel to one another in this case.

In principle, any desired fuel-resistant plastics which have high deformation resistance can be used as a support for the ferrite. However, polyphenylene sulfide (PPS) is a particularly advantageous plastic which bonds the ferrite, especially for providing the shaped body with a high degree of chemical resistance and very high dimensional stability. A further advantage of PPS is its inherent flame resistance. Since the ferrite is responsible for the permanent-magnet properties of the rotor, it is also expedient if it has a high coercive force.

According to one advantageous development of the invention which was discovered from experiments, the shaped body has stabilizing fiber material. A proportion by volume of approximately 2% of glass fibers has proven particularly suitable and also cost-effective.

It is possible to imagine placing the shaped body, for example, onto the shaft and adhesively bonding them. In contrast, a particularly simple and long-lasting connection between the rotor and the shaft while at the same time avoiding an unbalance of the rotor is ensured when, according to another advantageous development of the invention, the shaped body is injection molded onto the shaft and, in a connecting region between the shaft and the shaped body, the shaft has a pattern which increases its surface roughness. This pattern may be, for example, a roughened section or—particularly advantageously—a knurled formation.

The motor can be produced in a particularly simple and cost-effective manner when, according to another advantageous development of the invention, the return element is pressed onto the shaft. In this case, the return element can be pressed onto the shaft, after the shaped body and shaft are connected, so as to ensure exact adjustment in relation to the shaped body.

BRIEF DESCRIPTION OF THE DRAWING

One exemplary embodiment of the invention is illustrated in the drawing and described in greater detail in the following text. In the drawing, the single FIG. 1 shows a partial sectional view of a motor for a fuel pump.

DETAILED DESCRIPTION OF THE PREFERRED EMBODIMENT

The FIGURE is a schematic view of a rotor 1 of an electronically commutated motor (not illustrated in any more detail) for a fuel pump, said rotor having two or more magnetic poles. The rotor 1 is connected to a shaft 2 in a rotationally fixed manner and has a plastic-bonded ferrite 4 which is admixed with a stabilizing fiber material. The plastic-bonded ferrite 4 forms a fuel-resistant shaped body 6 which is injection molded onto the shaft 2 and at the same time is magnetized, so that it forms a multipole permanent magnet. In a connecting region 8 between the shaft 2 and the shaped body 6, the shaft 2 has a pattern 10 which increases its surface roughness and is in the form of a knurl.

The shaped body 6 also has an axial recess 12 in which a return element 14 which is composed of a soft-magnetic material 16 engages. The return element 14 increases the magnetic flux and, in accordance with requirements, may be dimensioned as a function of the shaped body 6 and the motor/pump system. The axial recess 12 in the shaped body 6 has an opening side 18 at one end and a base side 20, which is situated opposite the opening side 18, at the other end. The shaped body 6 is connected to the shaft 2 at the base side 20 of the recess 12. It can also be seen that the return element 14 is arranged entirely within the shaped body 6.

In order to adjust the return element 14 in relation to the shaped body 6, the axial recess 12 in said shaped body forms a funnel 22 which widens conically toward the opening side 18. In a manner which corresponds to the funnel 22, the return element 14 forms a cone 24 which tapers toward the base side 20 of the recess 12. In this case, the opening angle $\beta$ of the funnel 22 and the cone angle $\beta$ of the cone 24 correspond, so that an air gap 26 is bounded by parallel faces. When the return element 14 which is pressed onto the shaft 2 is adjusted in relation to the shaped body 6, which is done by moving said return element in the directions indicated by the double-headed arrow 28, the air gap 26 is therefore uniformly changed. The width of the air gap 26 directly influences the magnetic flux.

The invention claimed is:

1. An electronically commutated motor for a fuel pump, comprising a rotor which is connected to a shaft in a rotationally fixed manner and has a plastic-bonded ferrite, wherein the rotor has a fuel-resistant shaped body which is formed by the plastic-bonded ferrite, and a magnetic return element adjustable in relation to the shaped body by being moved on the shaft, with the shaped body having an axial recess in which the return element (14) engages, with the axial recess having an opening side and a base side which is situated opposite the opening side and at which the shaped body is connected to the shaft, and with the axial recess forming a funnel which widens conically toward the opening side, and in that the return element forms a cone which tapers toward the base side of the recess.

2. The motor as claimed in claim 1, wherein the funnel has an opening angle and the cone has an angle, and the funnel opening angle corresponds to the cone angle of the cone.

3. The motor as claimed in claim 1, wherein the plastic which bonds the ferrite is polyphenylene sulfide.

4. The motor as claimed in claim 1, wherein the shaped body has stabilizing fiber material.

5. The motor as claimed in claim 1, wherein the shaped body is injection molded onto the shaft, and in a connecting region between the shaft and the shaped body, the shaft has a pattern which increases surface roughness of the shaft.

6. The motor as claimed in claim 1, wherein the return element is adjustable in relation to the shaped body by being moved on the shaft.

7. The motor as claimed in claim 2, wherein the plastic which bonds the ferrite is polyphenylene sulfide.

8. The motor as claimed in claim 2, wherein the shaped body has stabilizing fiber material.

9. The motor as claimed in claim 2, wherein the shaped body is injection molded onto the shaft, and in a connecting region between the shaft and the shaped body, the shaft has a pattern which increases surface roughness of the shaft.

10. The motor as claimed in claim 2, wherein the return element is adjustable in relation to the shaped body by being moved on the shaft.

11. The motor as claimed in claim 3, wherein the shaped body has stabilizing fiber material.

12. The motor as claimed in claim 3, wherein the shaped body is injection molded onto the shaft, and in a connecting region between the shaft and the shaped body, the shaft has a pattern which increases surface roughness of the shaft.

13. The motor as claimed in claim 3, wherein the return element is adjustable in relation to the shaped body by being moved on the shaft.

14. The motor as claimed in claim 4, wherein the shaped body is injection molded onto the shaft, and in a connecting region between the shaft and the shaped body, the shaft has a pattern which increases surface roughness of the shaft.

15. The motor as claimed in claim 4, wherein the return element is adjustable in relation to the shaped body by being moved on the shaft.

16. The motor as claimed in claim 5, wherein the return element is adjustable in relation to the shaped body by being moved on the shaft.

17. The motor as claimed in claim 7, wherein the shaped body has stabilizing fiber material.

18. The motor as claimed in claim 17, wherein the shaped body is injection molded onto the shaft, and in a connecting region between the shaft and the shaped body, the shaft has a pattern which increases surface roughness of the shaft.

19. The motor as claimed in claim 18, wherein the return element is adjustable in relation to the shaped body by being moved on the shaft.

* * * * *